(12) United States Patent
Fan et al.

(10) Patent No.: US 9,009,500 B1
(45) Date of Patent: Apr. 14, 2015

(54) METHOD OF CORRELATING POWER IN A DATA CENTER BY FITTING A FUNCTION TO A PLURALITY OF PAIRS OF ACTUAL POWER DRAW VALUES AND ESTIMATED POWER DRAW VALUES DETERMINED FROM MONITORED CPU UTILIZATION OF A STATISTICAL SAMPLE OF COMPUTERS IN THE DATA CENTER

(75) Inventors: Xiaobo Fan, Sunnyvale, CA (US); Mark D. Hennecke, Cupertino, CA (US); Taliver Brooks Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 464 days.

(21) Appl. No.: 13/352,516

(22) Filed: Jan. 18, 2012

(51) Int. Cl.
*G06F 1/00* (2006.01)
*G06F 1/26* (2006.01)
*G06F 19/00* (2011.01)
*G06F 9/50* (2006.01)

(52) U.S. Cl.
CPC ........................................ *G06F 9/50* (2013.01)

(58) Field of Classification Search
CPC .................................. G06F 19/00; G06F 1/26
USPC ........................................ 713/300, 321, 322
See application file for complete search history.

(56) References Cited

U.S. PATENT DOCUMENTS

| | | | |
|---|---|---|---|
| 4,360,849 A | 11/1982 | Harris et al. | |
| 4,954,945 A | 9/1990 | Inoue | |
| 5,119,014 A | 6/1992 | Kronberg | |
| 5,339,445 A | 8/1994 | Gasztonyi | |
| 5,432,947 A | 7/1995 | Doi | |
| 5,458,991 A | 10/1995 | Severinsky | |
| 5,552,640 A | 9/1996 | Sutton et al. | |
| 5,579,522 A | 11/1996 | Christeson et al. | |
| 5,694,307 A | 12/1997 | Murugan | |
| 5,694,607 A | 12/1997 | Dunstan et al. | |

(Continued)

FOREIGN PATENT DOCUMENTS

EP    1 439 622 A1    7/2004
KR    10-2002-0032128    5/2002

(Continued)

OTHER PUBLICATIONS

U.S. Appl. No. 12/690,022, filed Jan. 19, 2010, Sudindranath et al.

(Continued)

*Primary Examiner* — Jaweed A Abbaszadeh
*Assistant Examiner* — Terrell Johnson
(74) *Attorney, Agent, or Firm* — Fish & Richardson P.C.

(57) ABSTRACT

The subject matter of this specification can be embodied in, among other things, a method that includes supplying power to a portion of a data center through a power distribution line. Utilization of a statistically significant sample of the computers is monitored, and an estimated individual power draw for each of the computers based on the utilization is calculated. An estimated total power draw is calculated for different times from the estimated individual power draws to generate a collection of estimated total power draw values for the different times. Actual power draw is monitored at the power distribution line and a collection of actual power draw values is generated. A function is fitted to pairs of actual power draw values and estimated power draw values, each pair comprising an actual draw value and an estimated draw value for the same time, and the function is then stored.

22 Claims, 8 Drawing Sheets

(56) References Cited

U.S. PATENT DOCUMENTS

| | | |
|---|---|---|
| 5,828,568 A | 10/1998 | Sunakawa et al. |
| 5,844,884 A | 12/1998 | Szlenski |
| 5,856,776 A | 1/1999 | Armstrong et al. |
| 5,952,617 A | 9/1999 | Bergstrom |
| 6,009,177 A | 12/1999 | Sudia |
| 6,055,640 A | 4/2000 | Kageshima et al. |
| 6,141,192 A | 10/2000 | Garzon |
| 6,223,205 B1 | 4/2001 | Harchol-Balter et al. |
| 6,289,684 B1 | 9/2001 | Guidry, II et al. |
| 6,345,240 B1 | 2/2002 | Havens |
| 6,374,627 B1 | 4/2002 | Schumacher et al. |
| 6,429,706 B1 | 8/2002 | Amin et al. |
| 6,487,509 B1 | 11/2002 | Aisa |
| 6,496,366 B1 | 12/2002 | Coglitore et al. |
| 6,506,111 B2 | 1/2003 | Sharp et al. |
| 6,513,145 B1 | 1/2003 | Venkitakrishnan |
| D473,225 S | 4/2003 | Coglitore et al. |
| D475,705 S | 6/2003 | Coglitore et al. |
| 6,584,559 B1 | 6/2003 | Huh |
| 6,594,771 B1 | 7/2003 | Koerber et al. |
| 6,625,737 B1 | 9/2003 | Kissell |
| 6,652,373 B2 | 11/2003 | Sharp et al. |
| 6,652,374 B2 | 11/2003 | Sharp et al. |
| 6,667,891 B2 | 12/2003 | Coglitore et al. |
| 6,668,565 B1 | 12/2003 | Johnson et al. |
| 6,721,672 B2 | 4/2004 | Spitaels et al. |
| 6,741,467 B2 | 5/2004 | Coglitore et al. |
| 6,768,222 B1 | 7/2004 | Ricks |
| 6,770,810 B2 | 8/2004 | Wiebe et al. |
| 6,775,787 B2 | 8/2004 | Greene |
| 6,785,827 B2 | 8/2004 | Layton et al. |
| 6,804,616 B2 | 10/2004 | Bodas |
| 6,822,859 B2 | 11/2004 | Coglitore et al. |
| 6,824,362 B2 | 11/2004 | Dodson, III |
| 6,834,354 B1 | 12/2004 | Togawa |
| 6,847,995 B1 | 1/2005 | Hubbard et al. |
| 6,850,408 B1 | 2/2005 | Coglitore et al. |
| 6,859,366 B2 | 2/2005 | Fink |
| 6,867,570 B2 | 3/2005 | Vithayathil et al. |
| 6,880,349 B2 | 4/2005 | Johnson et al. |
| 6,901,521 B2 | 5/2005 | Chauvel et al. |
| 6,904,534 B2 | 6/2005 | Koenen |
| 6,907,395 B1 | 6/2005 | Hunt et al. |
| 6,915,438 B2 | 7/2005 | Boros |
| 6,935,130 B2 | 8/2005 | Cheng et al. |
| 6,937,947 B2 | 8/2005 | Trembley |
| 6,967,283 B2 | 11/2005 | Rasmussen et al. |
| 6,969,922 B2 | 11/2005 | Welches et al. |
| 6,980,433 B2 | 12/2005 | Fink |
| 6,986,066 B2 | 1/2006 | Morrow et al. |
| 7,010,363 B2 | 3/2006 | Donnelly et al. |
| 7,010,704 B2 | 3/2006 | Yang et al. |
| 7,011,576 B2 | 3/2006 | Sharp et al. |
| 7,020,586 B2 | 3/2006 | Snevely |
| 7,036,035 B2 | 4/2006 | Allison et al. |
| 7,046,514 B2 | 5/2006 | Fink et al. |
| 7,058,524 B2 | 6/2006 | Hayes et al. |
| 7,082,541 B2 | 7/2006 | Hammond et al. |
| 7,099,784 B2 | 8/2006 | Spitaels et al. |
| 7,123,477 B2 | 10/2006 | Coglitore et al. |
| 7,127,625 B2 | 10/2006 | Farkas et al. |
| 7,136,725 B1 | 11/2006 | Paciorek et al. |
| 7,145,772 B2 | 12/2006 | Fink |
| 7,161,557 B2 | 1/2007 | Thornton |
| 7,166,930 B2 | 1/2007 | Young |
| 7,173,820 B2 | 2/2007 | Fink et al. |
| 7,173,821 B2 | 2/2007 | Coglitore |
| 7,178,147 B2 | 2/2007 | Benhase et al. |
| 7,203,849 B2 | 4/2007 | Dove |
| 7,203,852 B2 | 4/2007 | Cohen et al. |
| 7,203,943 B2 | 4/2007 | Shaffer |
| 7,210,048 B2 | 4/2007 | Bodas |
| 7,222,030 B2 | 5/2007 | Banginwar et al. |
| 7,222,246 B2 | 5/2007 | Pomaranski et al. |
| 7,228,441 B2 | 6/2007 | Fung |
| 7,240,225 B2 | 7/2007 | Brewer et al. |
| 7,242,945 B2 | 7/2007 | Reddi |
| 7,272,517 B1 | 9/2007 | Brey et al. |
| 7,272,733 B2 | 9/2007 | Pomaranski et al. |
| 7,278,273 B1 | 10/2007 | Whitted et al. |
| 7,305,282 B2 | 12/2007 | Chen |
| 7,313,503 B2 | 12/2007 | Nakagawa et al. |
| 7,349,828 B1 | 3/2008 | Ranganathan et al. |
| 7,383,137 B2 | 6/2008 | Hanebutte |
| 7,383,454 B2 | 6/2008 | Loffink et al. |
| 7,420,293 B2 | 9/2008 | Donnelly et al. |
| 7,421,599 B2 | 9/2008 | Bahali et al. |
| 7,430,675 B2 | 9/2008 | Lee |
| 7,444,526 B2 | 10/2008 | Felter et al. |
| 7,457,976 B2 | 11/2008 | Bolan et al. |
| 7,461,273 B2 | 12/2008 | Moore et al. |
| 7,461,274 B2 | 12/2008 | Merkin |
| 7,467,306 B2 | 12/2008 | Cartes et al. |
| 7,467,311 B2 | 12/2008 | Bahali et al. |
| 7,469,351 B2 | 12/2008 | Baba et al. |
| 7,487,058 B2 | 2/2009 | Gross et al. |
| 7,493,235 B2 | 2/2009 | Artman et al. |
| 7,493,503 B2 | 2/2009 | Aldereguia et al. |
| 7,496,772 B1 | 2/2009 | Nguyen |
| 7,499,279 B2 | 3/2009 | Campbell et al. |
| 7,511,959 B2 | 3/2009 | Belady et al. |
| 7,511,960 B2 | 3/2009 | Hillis et al. |
| 7,514,815 B2 | 4/2009 | Paik et al. |
| 7,525,207 B2 | 4/2009 | Clidaras et al. |
| 7,529,086 B2 | 5/2009 | Fink et al. |
| 7,549,069 B2 | 6/2009 | Ishihara et al. |
| 7,549,070 B2 | 6/2009 | Zwinger et al. |
| 7,555,666 B2 | 6/2009 | Brundridge et al. |
| 7,561,977 B2 | 7/2009 | Horst et al. |
| 7,581,125 B2 | 8/2009 | Ranganathan et al. |
| 7,595,642 B2 | 9/2009 | Doyle |
| 7,633,181 B2 | 12/2009 | Gross et al. |
| 7,644,148 B2 | 1/2010 | Ranganathan et al. |
| 7,646,590 B1 | 1/2010 | Corhodzic et al. |
| 7,647,516 B2 | 1/2010 | Ranganathan et al. |
| 7,675,740 B2 | 3/2010 | Rasmussen et al. |
| 7,698,580 B2 | 4/2010 | Schindler et al. |
| 7,701,714 B2 | 4/2010 | Shabany |
| 7,702,931 B2 | 4/2010 | Goodrum et al. |
| 7,705,484 B2 | 4/2010 | Horst |
| 7,726,144 B2 | 6/2010 | Larson |
| 7,756,652 B2 | 7/2010 | Lewis et al. |
| 7,774,630 B2 | 8/2010 | Hatasaki et al. |
| 7,783,906 B2 | 8/2010 | Turner et al. |
| 7,783,909 B2 | 8/2010 | Hatasaki et al. |
| 7,818,594 B2 | 10/2010 | Gorbatov et al. |
| 7,825,536 B2 | 11/2010 | Jacobson et al. |
| 7,827,421 B2 | 11/2010 | Brewer et al. |
| 7,840,824 B2 | 11/2010 | Baba et al. |
| 7,844,839 B2 | 11/2010 | Palmer et al. |
| 7,856,549 B2 | 12/2010 | Wheeler |
| 7,863,769 B2 | 1/2011 | Busdiecker et al. |
| 7,904,287 B2 | 3/2011 | Lefurgy et al. |
| 7,996,839 B2 | 8/2011 | Farkas et al. |
| 8,010,215 B2 | 8/2011 | Borkenhagen et al. |
| 8,091,087 B2 | 1/2012 | Ali et al. |
| 8,214,843 B2 | 7/2012 | Boss et al. |
| 8,595,515 B1 | 11/2013 | Weber |
| 8,601,287 B1 | 12/2013 | Weber |
| 2001/0003207 A1 | 6/2001 | Kling et al. |
| 2002/0007463 A1 | 1/2002 | Fung |
| 2002/0065049 A1 | 5/2002 | Chauvel et al. |
| 2002/0194517 A1 | 12/2002 | Cohen et al. |
| 2003/0005339 A1 | 1/2003 | Cohen et al. |
| 2003/0048647 A1 | 3/2003 | Sadler et al. |
| 2003/0055969 A1 | 3/2003 | Begun et al. |
| 2003/0133263 A1 | 7/2003 | Shu |
| 2003/0197428 A1 | 10/2003 | Hatton et al. |
| 2003/0237008 A1 | 12/2003 | Freevol et al. |
| 2004/0004538 A1 | 1/2004 | Manis et al. |
| 2004/0020224 A1 | 2/2004 | Bash et al. |
| 2004/0150374 A1 | 8/2004 | Kraus |
| 2004/0163001 A1 | 8/2004 | Bodas |
| 2004/0167732 A1 | 8/2004 | Spitaels et al. |

(56) References Cited

U.S. PATENT DOCUMENTS

| | | |
|---|---|---|
| 2004/0184232 A1 | 9/2004 | Fink |
| 2004/0223300 A1 | 11/2004 | Fink et al. |
| 2004/0228087 A1 | 11/2004 | Coglitore |
| 2004/0247961 A1 | 12/2004 | Edlund |
| 2004/0265662 A1 | 12/2004 | Brignone et al. |
| 2005/0012395 A1 | 1/2005 | Eckroad et al. |
| 2005/0036248 A1 | 2/2005 | Klikic et al. |
| 2005/0071092 A1 | 3/2005 | Farkas et al. |
| 2005/0071699 A1 | 3/2005 | Hammond et al. |
| 2005/0088201 A1 | 4/2005 | Devlin |
| 2005/0099750 A1 | 5/2005 | Takahashi et al. |
| 2005/0099770 A1 | 5/2005 | Fink |
| 2005/0102544 A1 | 5/2005 | Brewer et al. |
| 2005/0132239 A1 | 6/2005 | Athas et al. |
| 2005/0165511 A1 | 7/2005 | Fairlie |
| 2005/0170770 A1 | 8/2005 | Johnson et al. |
| 2005/0171753 A1 | 8/2005 | Rosing et al. |
| 2005/0177755 A1 | 8/2005 | Fung |
| 2005/0200205 A1 | 9/2005 | Winn et al. |
| 2005/0240934 A1 | 10/2005 | Patterson et al. |
| 2006/0007653 A1 | 1/2006 | Fink |
| 2006/0020832 A1 | 1/2006 | Hung |
| 2006/0082263 A1 | 4/2006 | Rimler et al. |
| 2006/0085097 A1 | 4/2006 | Courtney |
| 2006/0098371 A1 | 5/2006 | Wambsganss et al. |
| 2006/0107262 A1 | 5/2006 | Bodas et al. |
| 2006/0187636 A1 | 8/2006 | Fink et al. |
| 2006/0259622 A1 | 11/2006 | Moore et al. |
| 2006/0284489 A1 | 12/2006 | Gross et al. |
| 2007/0016814 A1 | 1/2007 | Rusu et al. |
| 2007/0038414 A1 | 2/2007 | Rasmussen et al. |
| 2007/0050644 A1 | 3/2007 | Merkin |
| 2007/0052294 A1 | 3/2007 | Kraus |
| 2007/0076373 A1 | 4/2007 | Fink |
| 2007/0086364 A1 | 4/2007 | Ellis et al. |
| 2007/0089446 A1 | 4/2007 | Larson et al. |
| 2007/0143760 A1 | 6/2007 | Chan et al. |
| 2007/0150215 A1* | 6/2007 | Spitaels et al. .................. 702/61 |
| 2007/0168161 A1 | 7/2007 | Vellore et al. |
| 2007/0198383 A1 | 8/2007 | Dow et al. |
| 2007/0220292 A1 | 9/2007 | Ishihara et al. |
| 2007/0274035 A1 | 11/2007 | Fink et al. |
| 2007/0291433 A1 | 12/2007 | Ziegler et al. |
| 2007/0300083 A1 | 12/2007 | Goodrum et al. |
| 2008/0030078 A1 | 2/2008 | Whitted et al. |
| 2008/0039979 A1 | 2/2008 | Bridges et al. |
| 2008/0062647 A1 | 3/2008 | Hillis et al. |
| 2008/0064317 A1 | 3/2008 | Yates et al. |
| 2008/0094797 A1 | 4/2008 | Coglitore et al. |
| 2008/0106241 A1 | 5/2008 | Deaver et al. |
| 2008/0114997 A1 | 5/2008 | Chin |
| 2008/0123288 A1 | 5/2008 | Hillis |
| 2008/0165714 A1 | 7/2008 | Dettinger et al. |
| 2008/0168282 A1 | 7/2008 | Brundridge |
| 2008/0172312 A1 | 7/2008 | Synesiou et al. |
| 2008/0234873 A1* | 9/2008 | Gorbatov et al. ............. 700/291 |
| 2008/0278003 A1 | 11/2008 | Pouchet et al. |
| 2009/0050591 A1 | 2/2009 | Hart et al. |
| 2009/0070611 A1 | 3/2009 | Bower et al. |
| 2009/0138100 A1 | 5/2009 | Khorramshahi |
| 2009/0138219 A1 | 5/2009 | Bletsch et al. |
| 2009/0138313 A1 | 5/2009 | Morgan et al. |
| 2009/0187776 A1* | 7/2009 | Baba et al. .................... 713/320 |
| 2009/0195977 A1 | 8/2009 | Fink et al. |
| 2009/0241578 A1 | 10/2009 | Carlson et al. |
| 2009/0259345 A1* | 10/2009 | Kato et al. ..................... 700/295 |
| 2009/0281846 A1 | 11/2009 | Rose |
| 2010/0050008 A1 | 2/2010 | Allalouf et al. |
| 2010/0088205 A1 | 4/2010 | Robertson |
| 2010/0100250 A1 | 4/2010 | Budhraja et al. |
| 2010/0138174 A1 | 6/2010 | Archibald et al. |
| 2010/0262842 A1* | 10/2010 | Kansal et al. .................. 713/300 |
| 2010/0314942 A1 | 12/2010 | Talkin et al. |
| 2010/0318827 A1 | 12/2010 | Shah et al. |
| 2011/0106326 A1 | 5/2011 | Anunobi et al. |
| 2012/0066519 A1* | 3/2012 | El-Essawy et al. ............ 713/300 |
| 2012/0110350 A1 | 5/2012 | Horvath et al. |
| 2012/0144219 A1* | 6/2012 | Salahshour et al. .......... 713/322 |
| 2012/0181869 A1 | 7/2012 | Chapel et al. |
| 2012/0330586 A1* | 12/2012 | Gatts et al. ....................... 702/61 |

FOREIGN PATENT DOCUMENTS

| | | |
|---|---|---|
| KR | 10-2008-0019938 | 5/2008 |
| WO | WO 01/20496 A1 | 3/2001 |
| WO | WO 2007/064265 A1 | 6/2007 |
| WO | WO 2007/082351 A1 | 7/2007 |

OTHER PUBLICATIONS

"Protect High-Density Equipment From Thermal Damage—Guaranteed," APC Currents, Sep. 2007, 18(4):3 pages.

'Advanced Micro Devices, Inc.,' [online]. "AMD Opteron Processor with Direct Connect Architecture," Sep. 2006 [retrieved on Sep. 3, 2009]. Retrieved from the Internet: http://enterprise.amd.com/downloads/2P_Power_PID_41497, 2 pages.

'Analog Devices' [online]. "Intelligent Temperature Monitor and PWM Fan Controller," 2003, [retrieved on Oct. 24, 2006]. Retrieved from the Internet: www.analog.com/UploadedFiles/Data_Sheets/ADM1030.pdf#xml=http://search.analog.com/search/pdfPainter.aspx?url=http://www.analog.com/UploadedFiles/Data_Sheets/ADM1030.pdf&fterm=Intelligent&fterm=Temperature&fterm=Intelligent_Temperature&la=en , 28 pages.

'Electronic Design' [online]. "Low-cost fan manager for power-supply applications," 2006, [retrieved on Oct. 23, 2006]. Retrieved from the internet: www.elecdesign.com/Articles/Index.cfm?ArticleID=6281, 3 pages.

'Intel Corporation' [online]. "Dual-Core Intel® Xeon Processor LV and ULV Datasheet," [online] Sep. 2006 [Retrieved on Sep. 3, 2009]. Retrieved from the Internet: http://download.intel.com/design/intarch/datashts/31139101, 72 pages.

'Maxim/Dallas Semiconductor' [online]. "Circuit Converts PWM Fan Drive to Linear and Reduces Acoustic Noise," 2006, [retrieved on Oct. 23, 2006]. Retrieved from the Internet: www.maxim-ic.com/appnotes.cfm/an_pk/3530 , 3 pages.

'Micron Technology, Inc.' [online]. "Calculating Memory System Power for DDR," 2001 [Retrieved on Sep. 3, 2009]. Retrieved from the Internet: http://downloaded.micron.com/pdf/technotes/ddr/TN4603, 26 pages.

'National Semiconductor' [online]. "LM64-+-1C Remote Diode Temperature Sensor with PWM Fan Control and 5 GPIO's," 2006, [retrieved on Oct. 23, 2006]. Retrieved from the Internet: http://www.elecdesign.com/Articles/Index.cfm?ArticleID=6281, 3 pages.

'Seagate Technology LLC' [online]. "Product Manual Barracuda 7200.7," Sep. 2005 [Retrieved on Sep. 3, 2009]. Retrieved from the Internet: http://www.seagate.com/support/disc/manuals/ata/cuda7200pm, 54 pages.

'Slashdot' [online]. "Building an Energy Efficient Datacenter?" [retrieved on Sep. 6, 2007]. 1997-2007, 25 pages.

'Sun' [online] "Project Blackbox-Scenarios," Retrieved Oct. 19, 2006, Retrieved from the internet: http://www.sun.com/emrkt/blackbox/scenarios.jsp , 7 pages.

'Sun' [online]. "Project Blackbox" [retrieved Oct. 19, 2006]. Retrieved from the internet http://www.sun.com/emrkt/blackbox/index.jsp , 3 pages.

'T10 Project 1142D—Working Draft SCSI Parallel Interface-2' [online]. American National Standard, Apr. 13, 1998, [retrieved on Oct. 23, 2006]. Retrieved from the Internet: www.t10.org/ftp/t10/drafts/spi2/spi2r20b, 3 pages.

"Advanced Power Management with Dell OpenManagement Power Center," Dell Inc., Mar. 2012, 21 pages.

"Cisco Data Center Infrastructure 2.5 Design Guide," Cisco Systems, Inc., Dec. 6, 2007, 180 pages.

"Data Center Design and Implementation with Cisco Catalyst 6500 Services Modules," Cisco Systems, Inc., 2004, 88 pages.

"Data Center Power and Cooling—White Paper," Cisco, Aug. 2011, 25 pages.

(56) References Cited

OTHER PUBLICATIONS

"Federal Energy Regulatory Commission Staff Preliminary Assessment of the North American Electric Reliability Council's Proposed Mandatory Reliability Standards," Department of Energy-Federal Energy Regulatory Commission, May 11, 2006, 137 pages.

"HP Power Advisor Utility: A Tool for Estimating Power Requirements for HP ProLiant Server Systems—Technology Brief," Hewlett Packard, Aug. 2009, 22 pages.

"Optimizing Facility Operation in High Density Data Center Environments—Technology Brief," Hewlett Packard, Aug. 2007, 26 pages.

"Power Factor Correction: A Guide for the Plant Engineer," Cutler-Hammer, Jul. 2004, 26 pages.

"Principles for Efficient and Reliable Reactive Power Supply and Consumption," Federal Energy Regulatory Commission Staff Report, Feb. 4, 2005, 177 Pages.

"Principles for Efficient and Reliable Reactive Power Supply and Consumption," United States of America Before the Federal Energy Regulatory Commission, Mar. 8, 2005, 8 pages.

"Reducing Data Center Energy Consumption," Intel Corporation, White Paper, 2008, 8 pages.

"Regulatory Studies Program," Mercatus Center at George Mason University, 13 pages.

"Unified Physical Infrastructure (UPI) Strategies for Data Center Networking," Panduit, White Paper, Jul. 2007, 15 pages.

"Your Data Center: Powered by Sentilla," Sentilla Corporation, 2012, 4 pages.

Barroso et al., "Web Search for a Planet: The Google Cluster Architecture," IEEE Micro, Mar./Apr. 2003, 23(2):22-28.

Barroso, "The Price of Performance: An Economic Case for Chip Multiprocessing," ACM Queue, Sep. 2005, 3(7):49-53.

Bean et al., "Proper Sizing of IT Power and Cooling Loads White Paper" The Green Grid, 2009, 10 pages.

Bohrer et al., "The Case for Power Management in Web Servers," Power Aware Computing, 2002, pp. 261-289.

Burkhart, "FERC Takes on Reactive Power," Spark, Mar. 2005, Letter 15, 10 pages.

Carrera et al., "Conserving Disk Energy in Network Servers," ICS 2003: Proceedings of the 17th annual international conference on Supercomputing, Jun. 23-26, 2003, 14 pages.

Chan and More, "Measuring Power in your Data Center," [White Paper], Uptime Institute IT Symposium, 2009, 5 pages.

Chase et al., "Managing Energy and Server Resources in Hosting Centers," SOSP 2001: Proceedings of the eighteenth ACM symposium on Operating systems principles, 2001, pp. 103-116.

Computers and Knurr, "Energy Efficient Infrastructures for Data Centers," White Paper, Jul. 2007, 16 pages.

Contreras and Martonsi, "Power Prediction for Intel XScale Processors Using Performance Monitoring Unit Events," ISLPED 2005: Proceedings of the 2005 international symposium on Low power electronics and design, Aug. 8-10, 2005, pp. 221-226.

Conventional PCI 2.3—An Evolution of the Conventional PCI Local Bus Specification. [online]. PCI-SIG, Mar. 29, 2002 [Retrieved on Sep. 16, 2009]. Retrieved from the Internet: http://www.pcisig.com/members/downloads/specifications/conventional/conventional_pci_2_3, 328 pages.

Cringley, "Google-Mart: Sam Walton Taught Google More About How to Dominate the Internet Than Microsoft Ever Did," I, Cringely—The Pulpit, Nov. 17, 2005, 3 pages.

CUSC V1.3, "CUSC-Schedule 3," Apr. 2006, 65 pages.

Dean and Ghemawat., "MapReduce: Simplified Data Processing on Large Clusters," Communications of the ACM, Jan. 2008, 51(1):107-113.

Earley et al., "645.5 Supply Circuits and Interconnecting Cables," 2005 Ed., National Electrical Code Handbook, National Fire Protection Association, pp. 956-957.

Economou et al., "Full-System Power Analysis and Modeling for Server Environments" [online]. 2006 [Retrieved on Sep. 16, 2009]. Retrieved from the Internet: http://csl.stanford.edu/~christos/publications/2006.mantis.mobs, 8 pages.

Fan et al., "Power Provisioning for a Warehouse-sized Computer;" In Proceedings of the ACM International Symposium on Computer Architecture, Jun. 2007, 11 pages.

Felter et al., "A Performance-Conserving Approach for Reducing Peak Power Consumption in Server Systems," In ICS 2005: Proceedings of the 19th Annual International Conference on Supercomputing, Jun. 20-22, 2005, pp. 293-302.

Femal et al., "Boosting Data Center Performance Through Non-Uniform Power Allocation", IEEE Computer Society, Jun. 2005, pp. 1-12.

Femal et al., "Safe Overprovisioning: Using Power Limits to Increase Aggregate Throughput," 4th International Workshop on Power Aware Computer Systems (PACS 2004), Dec. 2004, pp. 150-164.

Filani et al., "Dynamic Data Center Power Management: Trends, Issues, and Solutions," Intel Technology Journal. Feb. 21, 2008, 12(1):59-67.

GlobeNewswire, Inc. [online]. "EnerNOC Deploys Industry's First Presence-Enabled Smart Grid Technology," 2009 [retrieved on May 3, 2014]. Retrieved from the Internet: http://files.shareholder.com/downloads/ENOC/0x0x291277/4c6d4655-cfe6-4e01-a690-ec811ee3194e/ENOC_News_2009_4_30_General_Releases.pdf, 2 pages.

Gwennap, "AppliedMicro's X-Gene: Minimizing Power in Data-Center Servers," The Linley Group, Jul. 2012, 9 pages.

Hamilton, "Commodity Data Center Design" Microsoft Corp, Apr. 17, 2007, 11 pages.

Hamilton, "An Architecture for Modular Data Centers," Microsoft Corp, CIDR 2007. 3rd Biennial Conference on Innovative Data Systems Research (CIDR), Jan. 7-10, 2007, pp. 306-313.

Heath et al., "Mercury and Freon: Temperature Emulation and Management for Server Systems," In International Conference on Architectural Support for Programming Languages and Operating Systems (ASPLOS '06), Oct. 21-25, 2006, pp. 106-116.

HP Enterprise Configurator. [online]. Hewlett-Packard Development Company, 2006 [retrieved on Sep. 3, 2009]. Retrieved from the Internet: http://h30099.www3.hp.com/configurator/powercales.asp, 2 pages.

Intel Xeon Processor with 512-KB L2 Cache at 1.80 GHz to 3 GHz Datasheet. [online]. Intel Corporation, Mar. 2003 [Retrieved on Sep. 24, 2009]. Retrieved from the Internet: http://download.intel.com/design/Xeon/datashts/29864206.pdf, 129 pages.

Jackson et al., "Data Center Power Requirements: Measurements from Silicon Valley," Energy 28, 2003, pp. 837-850.

Jiang et al, "Power Aware Job Scheduling with Quality of Service Guarantees: A Preliminary Study," Proceedings of the Second International Symposium on Networking and Network Security, Apr. 2010, 4 pages.

Lee, "Peeling the Power Onion," CERCS IAB Workshop, Apr. 26, 2010, 27 pages.

Matter, 'WEBLOG' [online]. "The Industrial Revolution, Finally," Retrieved from the internet: http://blogs.sun.com/Gregp/date/200610, Oct. 17, 2006, 5 pages.

Meisner and Wenisch, "Peak Power Modeling for Data Center Servers with Switched-Mode Power Supplies," ISLPED 2010, Aug. 18-20, 2010, 6 pages.

Moore et al., "Data Center Workload Monitoring, Analysis, and Emulation," In Eighth Workshop on Computer Architecture Evaluation using Commercial Workloads, Feb. 2005, 8 pages.

Moore et al., "Making Scheduling "Cool": Temperature-Aware Workload Placement in Data Centers," USENIX Annual Technical Conference, Apr. 10-15, 2005, pp. 61-74.

Rackable Systems, "Rackable Systems Contcentro Modular Data Center High Density, High Efficiency Mobile Computing," Datasheet 2007, 1 page.

Rackable Systems, "Thermal Management & Server Density: Critical Issues for Today's Data Center," White paper, 2004, 8 pages.

Ranganathan et al., "Ensemble-level Power Management for Dense Blade Servers," In ISCA 2006: Proceedings of the 33rd International Symposium on Computer Architecture, 2006, 12 pages.

Rasmussen, "Guidelines for Specification of Data Center Power Density," APC White Paper 120, 2005, 21 pages.

(56) References Cited

OTHER PUBLICATIONS

Sandoval and Soria, "A Primer on Power Factor Correction," Jun. 1, 2004, EC&M, Retrieved from the Internet: http://APrimerOnPowerFactor.mht, 5 pages.

Sanmina-Sci-Ecobay Product Sheet, "High-Performance Closed-Loop System," 2006, 2 pages.

Sawyer, "Calculating Total Power Requirements for Data Centers," White Paper 3. Revision 1, 2011, 10 pages.

Shankland, 'cNet News.com' [online]. "Sun Blackbox, meet APC's whitebox," Jan. 7, 2007, http://news.com.com/Sun+Blackbox%2C+meet+APCs+whitebox/2001-1010_3-617774.html , 2 pages.

System Management Interface Forum, "PMBus Power System Management Protocol Specification Part 1—General Requirements, Transport and Electrical Interface, Revision 1.0," Mar. 2005, 17 pages.

Terhune, "Principles for Efficient and Reliable Reactive Power Supply and Consumption," United States of America Before the Federal Energy Regulatory Commission, Mar. 8, 2005, 5 pages.

Turner IV et al., "Tier Classifications Define Site Infrastructure Performance," White Paper: The Uptime Institute, 2006, pp. 1-17.

\* cited by examiner

METHOD OF CORRELATING POWER IN A DATA CENTER BY FITTING A FUNCTION TO A PLURALITY OF PAIRS OF ACTUAL POWER DRAW VALUES AND ESTIMATED POWER DRAW VALUES DETERMINED FROM MONITORED CPU UTILIZATION OF A STATISTICAL SAMPLE OF COMPUTERS IN THE DATA CENTER

TECHNICAL FIELD

Various implementations relate generally to electrical power distribution.

BACKGROUND

In general, power distribution systems receive high voltage and/or high current electrical power from a utility provider, generator station, or other source of power. The power distribution systems may transform the received power to electrically powered equipment, such as the computers and cooling equipment in a data center. Electrical power is generally conducted by high current conductors that may be split into two or more branch conductors to divide and distribute electrical power. Some of these branches may be split to further divide and distribute electrical power. Each of the electrical conductors may be protected by circuit breakers, and/or other over-current protection devices to stop the flow of electrical currents in excess of the conductors' ratings.

SUMMARY

In general, this document describes systems, apparatus, and methods relate to current measurement devices that compare a load's estimated power draw to a measured power draw, and uses that feedback to improve the accuracy of subsequent power draw estimates. In an exemplary implementation, a power monitoring module (PPM) may estimate the power draw of a computer or group of computers based on a computing load assigned to the computer(s), measure the computer's actual power draw, and then use the measurement to determine a more accurate model for predicting the power draw of the computer(s) while operating at various computing loads. A more accurate model can permit a facility to operate closer to the maximum capacity of the power distribution system, with limited risk of exceeding the maximum capacity.

In a first aspect, a method of correlating power in a data center comprises supplying power to a portion of a data center through a power distribution line, the portion of the data center including a plurality of computers that draw power through a circuit breaker. Utilization of at least a statistically significant sample of the plurality of computers is monitored, and an estimated individual power draw for each of the sample of the plurality of computers based on the utilization is calculated. An estimated total power draw is calculated for each of a plurality of different times from the estimated individual power draw of each of the sample of the plurality of computers to generate a plurality of estimated total power draw values for the plurality of different times. Actual power draw is monitored at the power distribution line by the portion of the data center and a plurality of actual power draw values is generated for the plurality of different times. A function is fitted to a plurality of pairs of actual power draw values and estimated power draw values, each pair of the plurality of pairs comprising an actual draw value and an estimated draw value for the same time, and the function is then stored.

Various implementations can include some, all, or none of the following features. The utilization can be CPU utilization. Calculating the estimated individual power draw can include storing data representing a computer configuration for each of the plurality of computers, and the computer configuration can be an input to a function relating utilization to estimated individual power. The computer configuration can include one or more of processor speed, amount of memory or number of disk drives. Calculating the estimated total power draw can include summing the estimated individual power draw of each of the sample of the plurality of computers. The sample can include substantially all of the plurality of computers. The function can be a linear function. The method can also include receiving a maximum power draw value for the portion of the data center, calculating an estimated current individual power draw value for each of the sample of the plurality of computers based on the utilization, calculating an estimated current total power draw value from the estimated current individual power draw value of each of the sample of the plurality of computers, at least one of calculating an adjusted maximum power draw value from the maximum power draw value and the function, and comparing the estimated current total power draw value to the adjusted maximum power draw value, or calculating an adjusted estimated current total power draw value from the estimated current total power draw value and the function, and comparing the adjusted estimated total power draw value to the maximum power draw value, and adjusting operation of at least one computer in the plurality of computers based on the comparison. Adjusting operation can include one or more of adjusting job allocation, adjusting job scheduling or adjusting central processing unit execution frequency. Calculating an estimated individual power draw for a computer of the plurality of computers can include measuring utilization of the computer at a plurality of utilization measurement times to generate a plurality of utilization values for the computer, there being a greater number of utilization measurement times than different times such that there are a greater number of utilization values for the computer than different times. The method can further include associating each of the plurality of utilization values with one of the plurality of different times. Associating can include comparing a utilization measurement time for a utilization value with a midpoint between two adjacent different times. There can be a plurality of utilization value times for each of plurality of different times. Calculating the estimated total power draw for one of the different times can include weighting each one in a collection of estimated values based on a difference between a value estimating time for the estimate value and the different time. The method can further include synchronizing time stamps of the different times and the utilization measurement times. Calculating an estimated total power draw can occur at a higher frequency than monitoring actual power draw. The adjusting operation may include adjusting a multiplicity of computers in the plurality of computers to cause the estimated current total power draw value to be closer to the adjusted maximum power draw value. The adjusting operation may include adjusting a multiplicity of computers in the plurality of computers to cause the adjusted estimated total power draw value to be closer to the maximum power draw value.

The systems and techniques described here may provide one or more of the following advantages. First, a system can provide a more accurate estimate of the power to be used in a facility such as a data center. Second, a system can operate closer to the maxim capacity of the power distribution system. Third, the risk of exceeding the maximum capacity can be maintained at an acceptable level. Fourth, the system can help capture deployment or accounting errors if failed or highly skewed correlation is observed.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for accurately estimating the power to be used in a facility such as a data center. Electrical devices are generally rated for a maximum current draw, and in some instances these ratings can be somewhat conservative. In addition, the electrical devices may only occasionally, if ever, draw their rated currents. In some instances, power distribution systems can be conservatively built to supply the devices' rated currents. The collective power of the devices connected to branches of the power distribution system may remain conservatively below the breaker limit for their respective branch, and the attached devices may not be drawing their maximum amount of power simultaneously. Overall, a power distribution system may leave some portion of the available power unused, and the amount of unused power may increase as the number of power branches increases.

Hypothetically, the power draw of a computer can be estimated from the utilization of the computer. However, the algorithm that computes power draw from utilization may not be accurate. In addition, even if the computation of the power draw from a single computer is accurate, summation of the power draw of multiple computers may not accurately represent power drawn from a branch line, e.g., due to the presence of other devices on the branch line such as routers, lighting, and cooling systems. However, a load's estimated power draw can be compared to a measured power draw, and that feedback can be used to improve the accuracy of subsequent power draw estimates.

Figure 1:
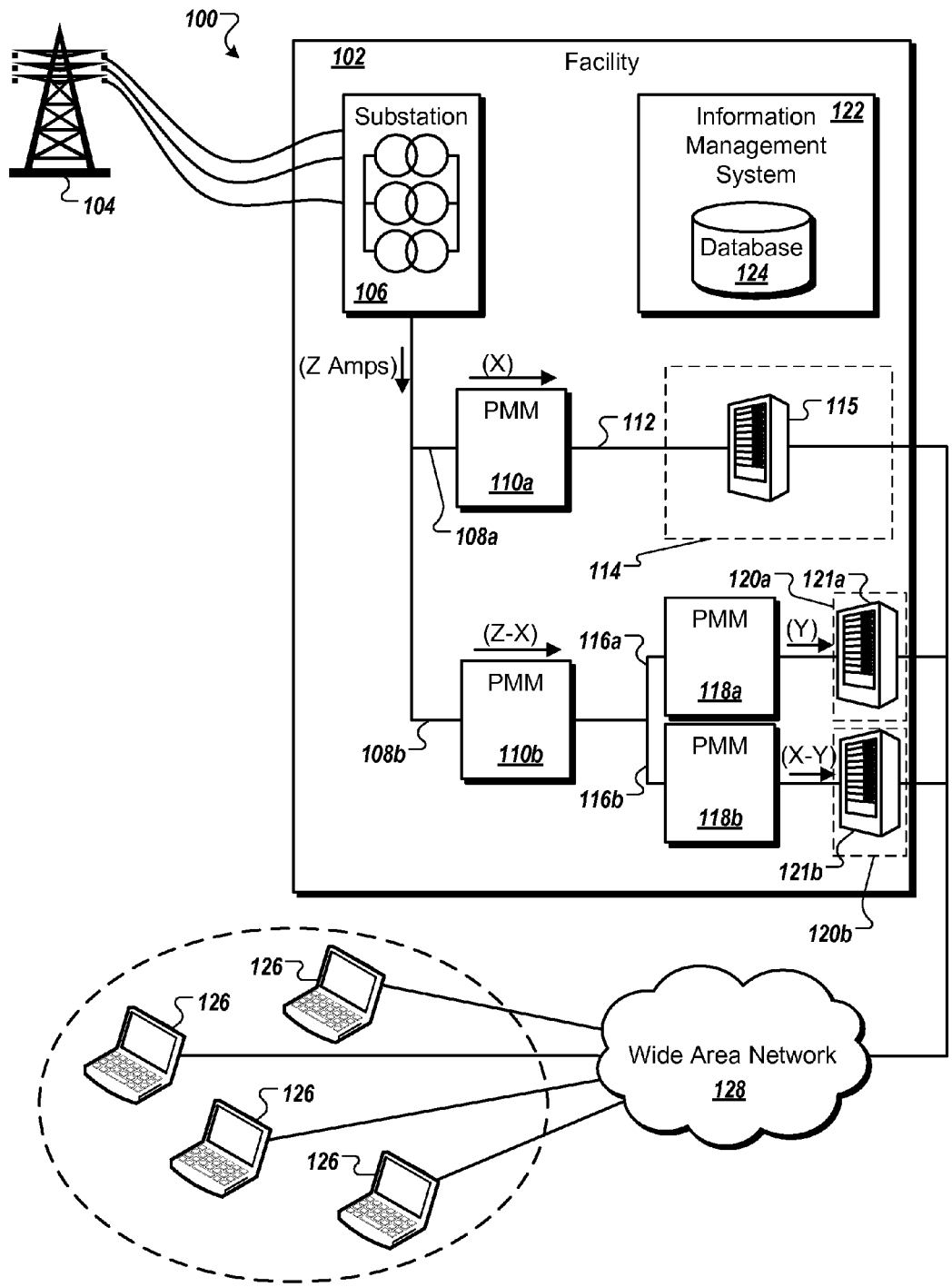
FIG. 1 shows an example power distribution system for the dynamic estimation of power consumption of power nodes.

FIG. 1 shows an example power distribution system 100 that includes dynamic estimation of power consumed by nodes in the system 100. The estimations for each node are configured to achieve improved utilization of electrical distribution infrastructure by allowing a network of current protection devices to intelligently estimate power draws of electrical loads in response to dynamic load conditions. For example, in the example depicted in FIG. 1, the power distribution system 100 includes a number of such power monitors, or power monitoring modules (PMMs), that estimate and monitor the amount of power needed by various load circuits under variable load conditions, while protecting the source node against overloads that would exceed the source node's predetermined capacity limit. For example, when current through a PMM approaches full (e.g., 100%, greater than 90%, greater than 85%) utilization of its present capacity estimation, the PMM may generate a request message asking child nodes to limit or reduce their present power consumption. In some implementations, the request message may include a workload limit for the child node. For example, the child node may be an electrical load such as a computer with a controllable clock speed, in which the speed of the computer's clock has a corresponding effect on the amount of power consumed by the computer. In another example, the child node may be an electrical load such as a battery charger or ventilation fan, in which the charge rate or fan speed, respectively, have corresponding effects on the amount of power drawn by the child node. Accordingly, a number of PMMs can operate together to automatically negotiate a capacity sharing arrangement that adapts to the dynamic load conditions to achieve improved utilization of infrastructure power handling capability to distribute power to meet peak power demands at different loads.

The power distribution system 100 includes a facility 102 that receives high voltage and/or current power from an electrical utility provider 104. The facility 102 can include a power substation 106. The power substation 106 transforms the high voltage and/or current power into usable voltages and/or currents for electrical loads in the facility 102, and distributes the transformed power through a power monitoring module (PMM) 107, and on to branch conductor 108*a* and a branch conductor 108*b*.

The branch conductor 108*a* includes a PMM 110*a*, and the branch conductor 108*b* includes a PMM 110*b*. The PMM 110*a* provides power monitoring for a circuit 112 that supplies power to an electrical load 114. The PMM 110*b* provides power monitoring for a branch conductor 116*a* and a branch conductor 116*b*. The branch conductors 116*a* and 116*b* include a PMM 118*a* and a PMM 118*b*, respectively. Although only two branches are shown at each level of the hierarchy of the power distribution system 100, this is merely illustrative, and any given node could have three or more branches, and there could be additional levels to the hierarchy.

The PMMs 118*a* and 118*b* provide power monitoring for an electrical load 120*a* and an electrical load 120*b*, respectively. If the facility is a data center, then the electrical loads 114, 120*a*, 120*b* include at least some server computers 115, 121*a*, 121*b*, respectively, such as one or more racks of server computers. In some implementations, the electrical loads 114, 120*a*, and 120*b* can include computers, collections of computers, racks of server computers, collections of racks of server computers, networking equipment, environmental control equipment, lighting systems, or combinations of these and other appropriate forms of electrical loads.

The PMMs 107, 110*a*, 110*b*, 118*a*, and 118*b*, are able to estimate and measure the amount of power consumed by their respective child nodes, and can communicate with each other to allocate power from a shared supply. In some implementations, the PMMs 107, 110*a*, 110*b*, 118*a*, and 118*b* can communicate in a peer-to-peer network. For example, the PMM 110*a* may send a message to the PMM 107 to request that the PMM 110*b* reduce the amount of power being consumed by its child nodes. If the request is granted, the PMM 110*a* may then raise the amount of power available to its own child nodes by a substantially like amount. In some implementations, the PMMs 107, 110*a*, 110*b*, 118*a*, and 118*b* can communicate with an information management system 122 which includes a database 124. For example, the PMMs may communicate with the information management system 122 to request and/or receive power estimation settings, or to send and/or receive statuses, alarms, notifications, configurations, or other data that may be used by the PMMs 107, 110a, 110b, 118a, and 118b. In some implementations, the information management system 122 can access the database 124 to store and retrieve information relating to the PMMs 107, 110a, 110b, 118a, and 118b.

The server computers 115, 121a, and 121b, serve information to a number of computers 126 via a wide area network (WAN) 128. In some implementations, the computers 126 can place varying computing loads upon the server computers 115, 121a, and 121b. For example, the server computer 115 may host email services, and the server computers 121a and 121b may host video sharing services. Demand for these two different services can vary as the amount of traffic from the computers 126 varies. For example, demand for email services may increase in the daytime as users of the computers 126 access their email for work, but in the evening the demand for email services may decrease while the demand for video sharing services increases as people browse videos during their free time.

As the computing loads vary, electrical current needs of the electrical loads 114, 120a, and 120b can vary as well. For example, during the day the computing load placed upon the server computers 115 may cause the electrical load 114 to draw 60 A of electrical power in order to operate, while the electrical loads 120a and 120b draw 20 A. At night, the server computers 115 may experience lower computing load, and therefore the electrical load 114 may draw 40 A while the server computers 121a and 121b may experience increased computing loads such that the electrical loads 120a and 120b experience a 70 A draw.

The branch conductors 108a and 108b share a supply, illustrated as "Z" amperes. The power monitoring module 110a is configured to allow a number of amperes of current, designated as "X", to pass onto the conductor 112, and the power monitoring module 110b is configured to allow the remaining number of amperes of current, designated by the value "Z-X", to pass along the conductors 116a and 116b. As the electrical current demand of the electrical load 114 varies, the value of "X" can vary as well. For example, Z may be 100 A, and the load connected to the PMM 110a may draw approximately 75 A, leaving approximately 25 A of capacity available for use by the loads connected to PMM 110b without exceeding the 100 A supply.

The PMM 110a may limit the amount of power it passes by estimating the amount of power the electrical load 114 consumes at a given utilization of the server computers 115. The PMM 110a may determine that the electrical load 114 will consume approximately "X" amperes when the server computers 115 are utilizing N % of their computing capacity. The PMM may request the server computers 115 in the electrical load 114 to limit their combined computing load to N % of capacity, thereby limiting the combined power consumption of the electrical load 114 to approximately "X" amperes.

The estimation, however, may not be completely accurate. For example, the electrical load 114 may actually draw 0.8*X amperes when the server computers 115 are at N % of computing capacity, thus underutilizing the amount of power available to the electrical load 114 (e.g., the server computers 115 could operate at more than N % utilization when the electrical load 114 is using "X" amperes), or the electrical load 114 may actually draw 1.3*X amperes when the server computers 115 are operating at N % utilization, thus consuming more than the "X" amperes allotted to the PMM 110a (e.g., and trip an "X" ampere circuit breaker, and over-stress the branch conductor 108a or the substation 106).

The PMMs 107, 110a, 110b, 118a, and 118b estimate the amounts of power their respective child nodes will draw for their respective utilizations, and compare those estimates to respective measured amounts of power that are drawn by their respective child nodes as they operate at those configured utilizations. The PMMs 107, 110a, 110b, 118a, and 118b compare the estimated and measured power amounts to determine correlations between utilization levels and actual power consumption. The PMMs 107, 110a, 110b, 118a, and 118b may then use the determined correlations when performing subsequent estimations of the power draws for various corresponding utilizations.

In some implementations, by intelligently allocating capacity among the PMMs 107, 110a, 110b, 118a, and/or 118b, electrical power utilization can increase without increasing the electrical supply capacity. For example, PMMs 107, 110a and 110b can be initially allocated 50 A each while the electrical load 114 is drawing 20 A, the electrical loads 120a and 120b are drawing 20 A each, and the PMMs 118a and 118b may be allocated 25 A apiece. The PMM 110a has approximately 30 A of excess capacity (50 A−20 A=30 A), while the PMM 110b may have 10 A (50 A−(2×20 A)=10 A). As computing demands change, the electrical load 120a may need to be reconfigured to draw an estimated 40 A, exceeding the allocation given to the PMM 118a. In some implementations, the PMM 118a can request the PMM 118b to limit its consumption by 5 A. If granted, the PMM 118b can reduce its estimated power consumption to 20 A and the PMM 118a can increase its own estimated power consumption to 30 A.

In this example, the PMMs 118a and 118b have substantially maximized their use of the 50 A allocated to the PMM 110b. However, there remains a 10 A shortage along the branch conductor 116a. In some implementations, the PMM 110a can request an additional power allocation from the upstream PMM 110b. For example, the PMM 118a can request an additional 10 A allocation from the PMM 110b. However, in this example, the PMM 110b is already configured to consume its allocated 50 A. In some implementations, the PMM 110b can send a message to the PMM 110a to determine if the PMM 110a has any unused capacity that could be re-allocated to the PMM 110b.

For example, the PMM 110b may request a 10 A allocation from the PMM 110a. Since the PMM 110a has 30 A of excess capacity, the PMM 110a may lower its own estimated power usage by 10 A and grant the freed capacity to the PMM 110b. The PMM 110b can then raise its estimated power use by 10 A to a total of 60 A, thereby satisfying the power needs of the electrical loads 120a and 120b, and increase the utilization of the 100 A available from the substation 106. Additional examples of intelligent power estimation are discussed in further detail in relation to FIGS. 2-8.

Figure 2:
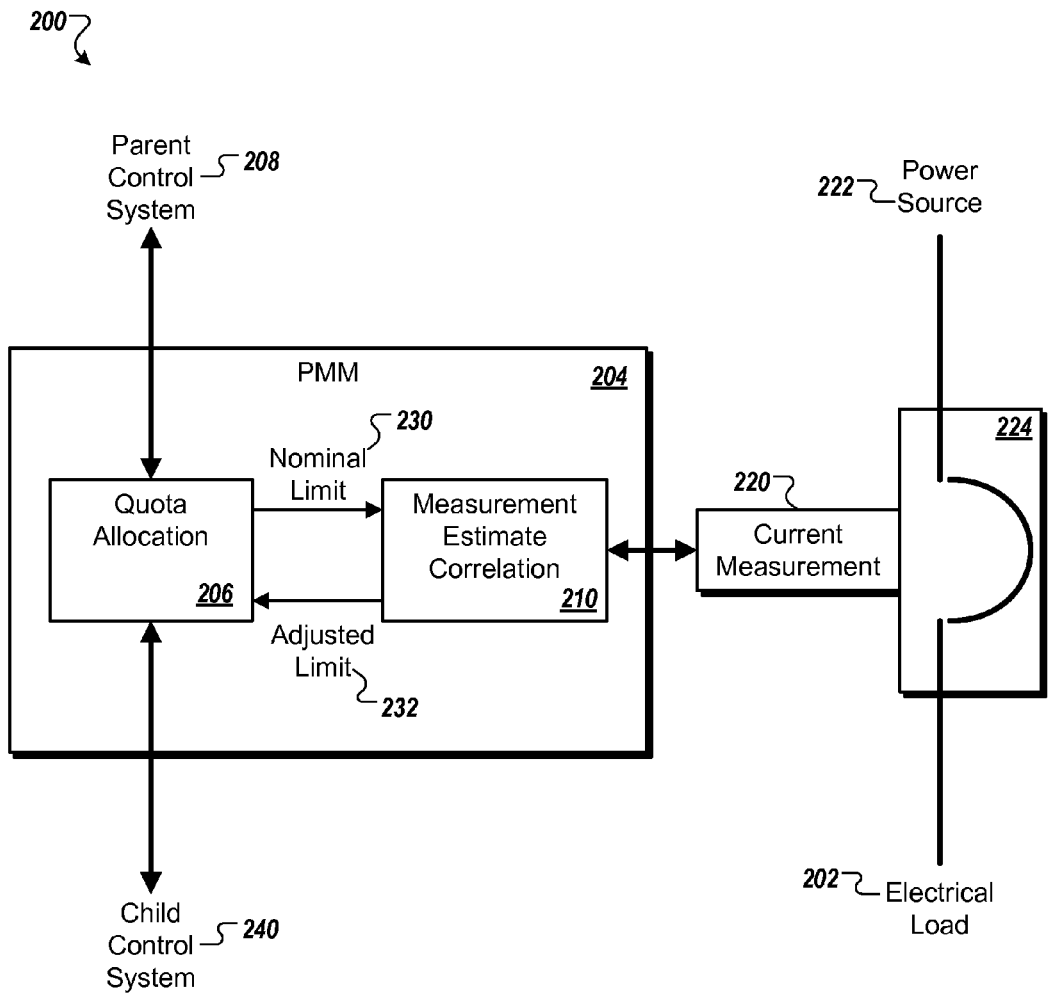
FIG. 2 is a block diagram that shows an example of a system for estimating the power draw of an electrical load.

FIG. 2 is a block diagram that shows an example of a system 200 for estimating the power draw of an electrical load 202. The system 200 includes a power monitoring module (PMM) 204. In some implementations, the PMM 204 can be the PMM 107, 110a, 110b, 118a, or 118b of FIG. 1.

The PMM 204 includes a quota allocation module 206. The quota allocation module 206 is communicatively connected to a parent control system 208. The quota allocation module 206 communicates with the parent control system 208 to receive power allocation quotas. For example, the parent control system 208 may determine that the PMM 204 is to be granted a 50 A allocation of power and communicate information about that allocation to the quota allocation module 206. In reference to FIG. 1, the PMM 118a may receive a power allocation of "Y" amperes from its parent PMM 110b.

Referring back to FIG. 2, the quota allocation module 206 is communicatively connected to a measurement estimation correlation module 210. The measurement estimate correlation module 210 is also communicatively connected to a current measurement module 220. The current measurement module 220 measures the amount of power flowing from a power source 222 to the electrical load 202 through a circuit protection module 224 (e.g., a circuit breaker). The measurement estimate correlation module 210 communicates with the current measurement module 220 to receive information descriptive of the amount of power being consumed by the electrical load 202.

The measurement estimate correlation module 210 receives a nominal limit value 230 from the quota allocation module 206, and determines an adjusted limit value 232 that is provided back to the quota allocation module 206. The quota allocation module 206 then provides the adjusted limit value to a child control system 240 associated with the electrical load 202. In some implementations, the adjusted limit value may also be provided to the parent control system 208. For example, the parent control system 208 may use the adjusted limit value to improve the accuracy of power allotments. The adjusted limit value is a value that the measurement estimate correlation module 210 estimates the child control system 240 will consume when operating in accordance with the adjusted limit value 232. In some implementations, the child control system 240 may be an electrical load, such as a computer or collection of computers, e.g., the server computers 115. For example, the adjusted limit value 232 may be a utilization value that may limit or otherwise control the computing throughput of the server computers 121a to control the amount of power consumed by the electrical load 120a. The PMM 118a may transmit the adjusted limit value 232 to the server computers 121a to cause the electrical load 120a to consume an estimated "Y" amperes.

In some implementations, the child control system 240 may be another PMM. For example, the adjusted limit value 232 may be an amperage limit that the downstream PMM is being requested to honor.

The current measurement module 220 measures the actual amount of power being consumed by the electrical load 202. As such, the measurement estimate correlation module 210 compares the nominal limit value 230, the adjusted limit value 232, and the actual power consumption measurement provided by the current measurement module 220 to modify the estimated correlation between the nominal limit value 230 and adjusted limits to determine a new value for the adjusted limit value 232. The new value for the adjusted limit value 232 is then provided by the quota allocation module 206 to the child control system 240. In some implementations, by using the measured power consumptions of the electrical load at various adjusted limits, the PMM 204 may determine improved adjusted limits that cause the electrical load 202 to consume power at levels that better adhere to respective nominal limits.

Figure 3:
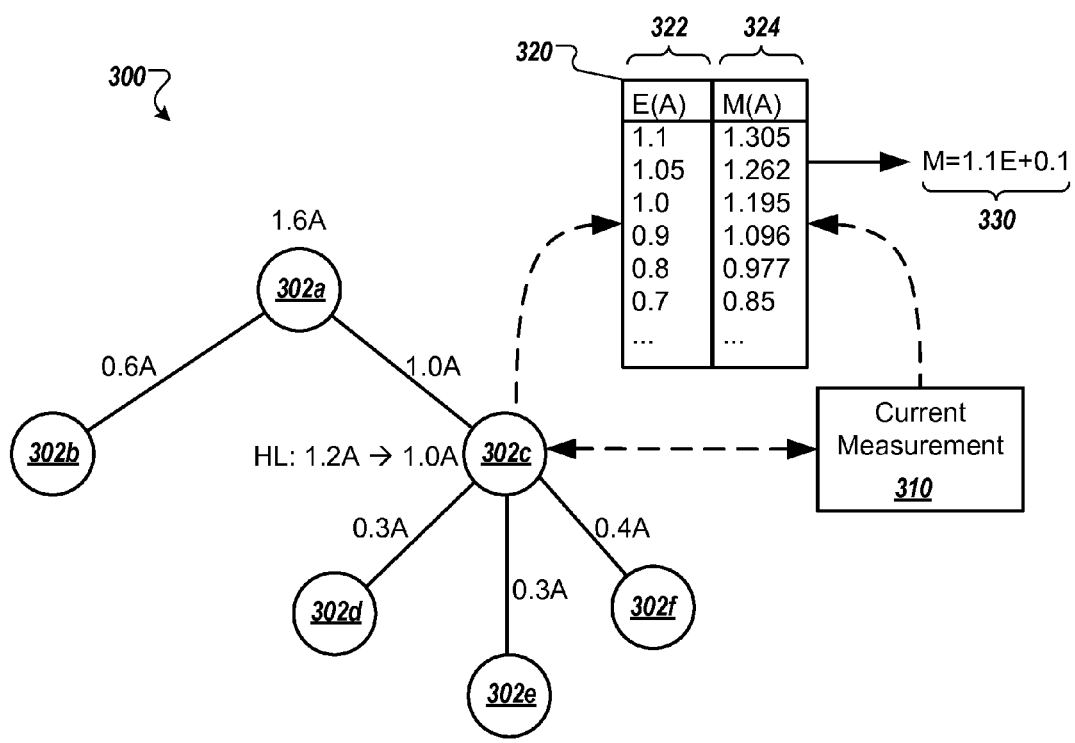
FIG. 3 depicts an example peer-to-peer interaction among intelligent protection modules for the dynamic estimation of power draw of power nodes.

FIG. 3 depicts an example peer-to-peer interaction 300 among a hierarchy of power monitoring modules (PMMs) 302a-302f for the dynamic estimation of power draw of power nodes. In some implementations, the PMMs 302a-302f can be the PMM 204 of FIG. 2, or the PMMs 107, 110a, 110b, 118a, or 118b o FIG. 1.

When deciding how to set the utilization "U" of the computers in order to achieve a target power "P", in some implementations one technique would be to use some function U=f(P). In some implementations, each computer receives the target power P from a PMM, and calculates its utilization from U=f(P) using the function f for that computer. The function f can be different for different computers, e.g., the function f can depend on the components in the computer. In some implementations, function f can be described in a lookup table, or by a collection of mathematical formulae in which each formula estimates power consumption for a corresponding utilization subrange.

The problem is that, in some implementations, the function f(P) may not be accurate due to limited measurement samples and workload varieties. In addition, the quota P given to a computer may not accurately represent the real available capacity due to the presence of other devices on the branch line such as routers, lighting, and cooling systems. For example, as previously noted, the function f(P) may not accurately represent power drawn from a branch line, e.g., due to the presence of other devices on the branch line such as routers, lighting, and cooling systems.

To reduce this inaccuracy, actual capacity, often defined by the circuit breaker's hard limit (HL0) of the branch, can be converted to an adjusted capacity (HL1) which is distributable to computers. In some implementations, a dynamic conversion of actual capacity to adjusted capacity can be performed in a three step process. An estimated power draw is calculated from utilization values. A functional relationship between the estimated power draw and the measured power draw is determined. The adjusted capacity is calculated based on the determined function using the actual capacity as the input.

In some implementations, the actual capacity can be converted to adjusted capacity using a function HL0=g(HL1), where g(HL1)=a*HL1+b. The function g can also be considered as a function that converts an estimated power draw E to a corrected estimated power draw M that is in the same parameter space as the measured power draw, e.g., M=g(E)=a*E+b. Parameter "a" generally compensates for proportional error between measured power draw and respective utilization-derived estimated power draw. Parameter "b" generally represents the constant power consumed by equipment but not included in a given aggregation path (e.g. networking equipment, lighting). The parameters "a" and "b" can be periodically updated to adjust for variations in the electrical loads 114, 120a, 120b.

In some implementations, parameters "a" and "b" can be determined from aggregated power estimates from the server computers and power drawn by the loads. The power drawn by the load is measured by the PMM at various different times, to create a plurality of measured power values "M". Similarly, the estimated power drawn by the server computers is collected at various different times to create a plurality of measured utilization values "E". For example, each of a statistically significant number of the server computers, e.g., all of the server computers, can calculate an estimated power Q drawn by that computer based on the utilization V at that computer, e.g., using the function f with V=f(Q). Each of these computers can report their estimated power draw Q to the PMM, and the PMM aggregates, e.g., sums, the estimated power Q from the individual server computers to generate an estimated power draw E' for the server computers in the load.

At least one estimated power value "E" is associated with each of at least some of the plurality of measured power values "M", thereby generating a sequence of pairs of measured power values "M" and estimated power values "E". For example, a collection of servers may each estimate their own individual power values on a substantially periodic interval (e.g., every 0.1, 1, 5, 10, 30, 60 seconds) and provide those estimated power values V to the PMM from which the servers draw their power. The PMM may then combine those individual estimated values to determine the estimated power value "E", and compare that estimate to power values M' that are measured by the PMM relatively less frequently (e.g., every 0.25, 0.5, 1, 2, 10 minutes). Due to potential higher sampling rate of the estimated power values E', multiple values of E' can be combined, e.g., averaged, to provide a single estimated power value E' for a given measured power value M'.

The values "a" and "b" can be calculated by fitting a function, e.g., a linear function, to the pairs of measured power values "M" and estimated power values "E". In essence, the pairs of values (M', E') provide a scatter plot to which the function is fit.

The fitting can generate a function g(x)=a*x+b. When used as a function to convert an estimated power draw E to a corrected estimated power draw M in the parameter space of the measured power draw, the functional relationship between the estimated power draw "E" and the corrected estimated power draw "M" can be a linear function, e.g., using the slope-intercept equation:

$$M=aE+b$$

Similarly, when considered as a function to convert to actual capacity HL0 to adjusted capacity HL1, the functional relationship can be a linear function:

$$HL0=a*HL1+b$$

In either case, parameter "a" compensates for proportional error, and parameter "b" represents the constant power consumed by equipment plugged into the power hierarchy but not included in a given aggregation path, such as networking equipment, lighting, and/or other appropriate electrical loads that are substantially constant contributors to a measured aggregate electrical load.

At levels where there is power measuring equipment such as a current measurement module 310, a collection of aggregated model-based estimates (E') 322 is compared with a collection of actual readings (M') 324 to determine values for the correlation value "b" and the proportional error value "a". In the illustrated example, the PMM 302c has gathered a collection of samples 320 during a recent time window by both aggregating updates from its child nodes (e.g., PMMs 302d-302f), and by communicating with the current measurement module 310.

In the illustrated example, fitting of a linear function 330 to the data generates an equation M=1.1 E+0.1, i.e., the proportional error value "a"="1.1" and the correlation value "b"="0.1". As such, when the PMM 302c determines the adjusted actual through which the 1.2 actual limit is converted to a 1.0 actual hard limit because the equation 330 projects that an estimated usage of 1.0 can lead to 1.2 actual measured power consumption. In use, the current measurement module 310 may not be able to provide readings as fine-grained or time-synchronized as the model-based estimates. In some implementations, multiple estimates may be aggregated to correlate one or more measurement readings. In some implementations, the fitting may be determined such that the model substantially compensates for any time offset between the 2 time series. A graphical example of a linear model of estimated values fitted to a collection of measured values is discussed in the description of FIG. 4.

Figure 4:
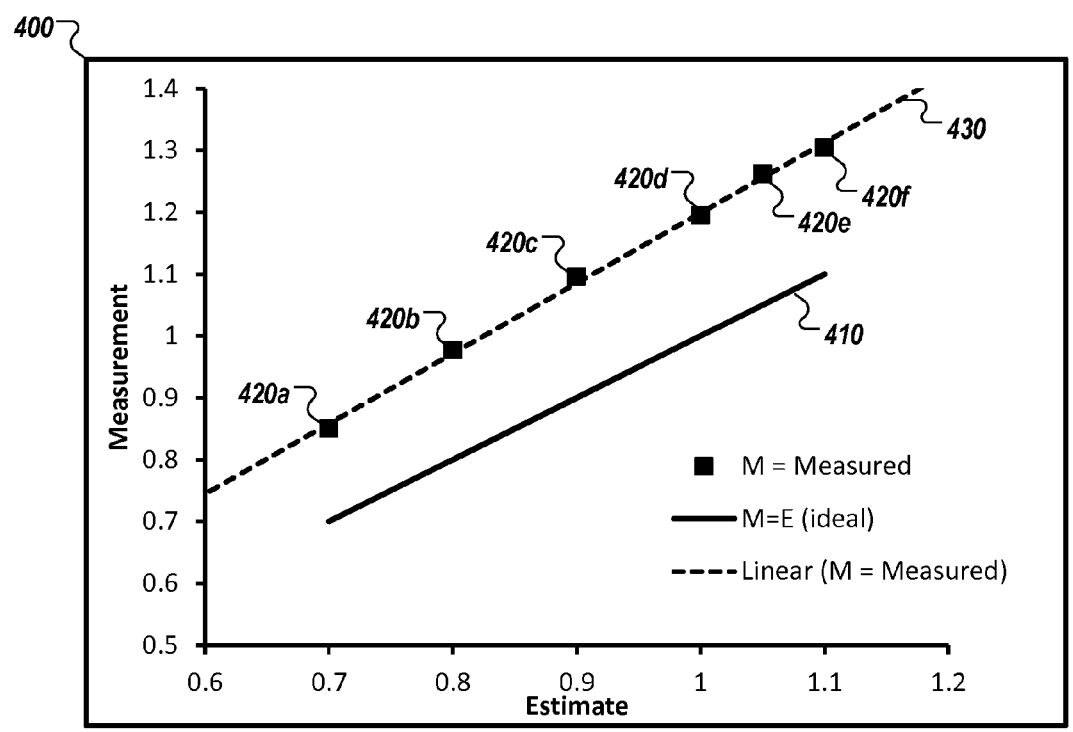
FIG. 4 is a graph of example estimated power consumption and example measured power consumption.

FIG. 4 is a graph 400 of example estimated power consumption and example measured power consumption. The graph 400 includes a line 410 which represents the ideal case, where measured values "M" are equal to estimated values "E". The graph 400 also includes a collection of measured values 420. The collection of measured values 420a-420f are measured values "M" for power consumption at selected estimated values "E" for power consumption. For example, for a predetermined level of utilization of the server computers 115, the estimated value "E" of the electrical load's 114 power consumption may be "1.0", however, the actual measured value "M" 420c may be "1.195".

A function, e.g., a linear function, represented by a line 430, is fit to the collection of measured values 420a-420c. A higher-order polynomial function can be used if a linear function does not fit sufficiently well. In some implementations, the determined solution represented by the line 430 may be used by the PMMs 110b and 302c to estimate the allocatable power capacity for the given actual limit. In some implementations, the determined solution represented by the line 430 may be used by the PMMs 107, 110a, 110b, 118a, 118b, 204, and 302a-302f to estimate the actual power consumption of various electrical loads for given estimated power values. In some implementations, PMMs 107, 110a, 110b, 118a, 118b, 204, and 302a-302f may use the determined solution as part of a process to determine utilization and/or other appropriate settings that may cause various electrical loads to consume a predetermined amount of electrical power.

Figure 5:
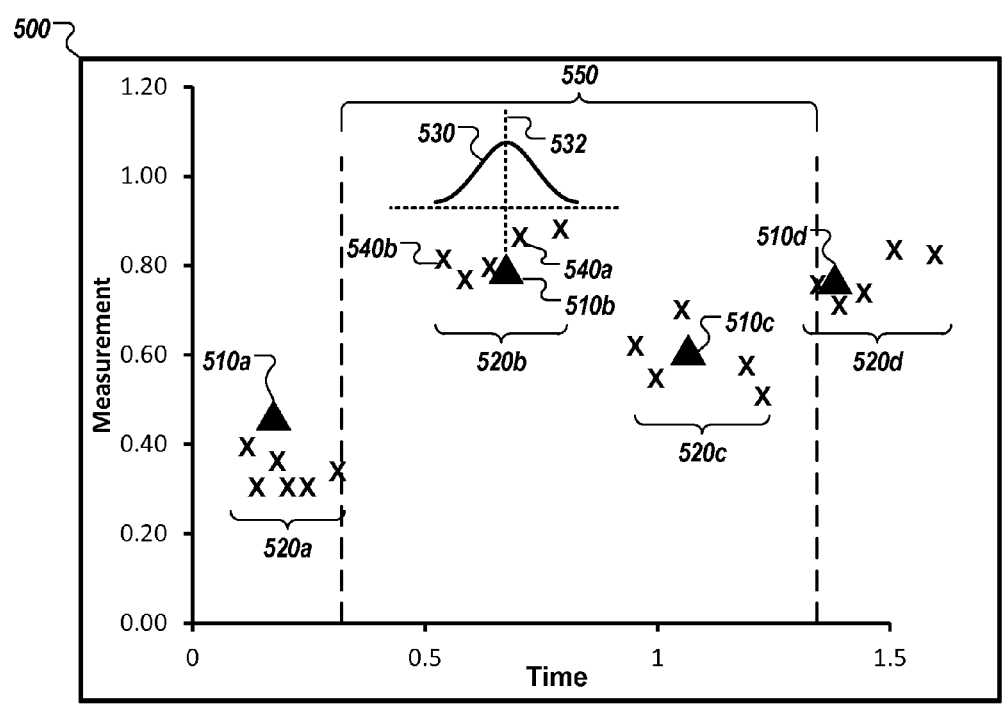
FIG. 5 is another graph of example estimated power consumption and example measured power consumption.

FIG. 5 is another graph 500 of example estimated power consumption and example measured power consumption over time. The graph 500 includes a sequence of measured power consumption values 510a-510d. The graph 500 also includes a sequence including a collection of estimated power values 520a, a collection of estimated power values 520b, a collection of estimated power values 520c, and a collection of estimated power values 520d. In some implementations, the measured values 510a-510d, and the values in the collections of estimated values 520a-520d may include timestamps of when the different estimations and measurements were taken.

Each of the collections of estimated values 520a-520d represents multiple estimated power consumption values taken at various times for a corresponding one of the measured power consumption values 510a-510d. In some implementations, estimated power consumption values may be taken multiple times because the estimates may often have higher frequency than then measurements.

In some implementations, a single measured value may be determined for each of the collections of measured values 520a-520d. In some implementations, an average value may be determined for each of the collections 520a-520d.

In some implementations, each of the collections of estimated values 520a-520d may be associated with one of a collection of different times. In the illustrated example, each of the collections of estimated values 520a-520d is associated with corresponding measured values 510a-510d, taken at different times.

In some implementations, a weighting process may be applied to determine a value to represent each of the collections of estimated values 520a-520d. For example, current consumption values that have been estimated at points in time close to when a measured midpoint value has been assigned may be given relatively greater mathematical weight than are values estimated at relatively more distant periods of time away from the measured value. In the illustrated example, a statistical normal curve 530 has been superimposed on the graph 500 and centered on a midpoint 532 when the measured value 510b was assigned to an electrical load. The curve 530 represents one example type of weighting that may be used to determine the relative influences of the various values included in the collection 520b (e.g., vertically higher points on the curve 530 represent relatively higher weightings for estimated values than points vertically lower on the curve 530). In the illustrated example, an estimated value 540a is given a statistically greater weight than an estimated value 540b because the value 540a is time-wise closer to the measured value 510b than the value 540b.

In some implementations, solutions for estimated power consumption values may be fitted to substantially only the measured power consumption values measured within a predetermined time period. For example, by limiting the fitting process to only consider values measured within a recent window of time, changes in the offset value "b" may be better accommodated (e.g., a cooling fan or light was turned on or off, a network switch was added to or removed from the measured electrical load). In the illustrated example, a time period 550 includes the estimated values 510b and 510c and the collections of measured values 520b and 520c, and as such, a model may be determined those values while ignoring values from beyond the time period 550 (e.g., values 510a and 510d, collections 520a and 520d).

Figures 6, 7:
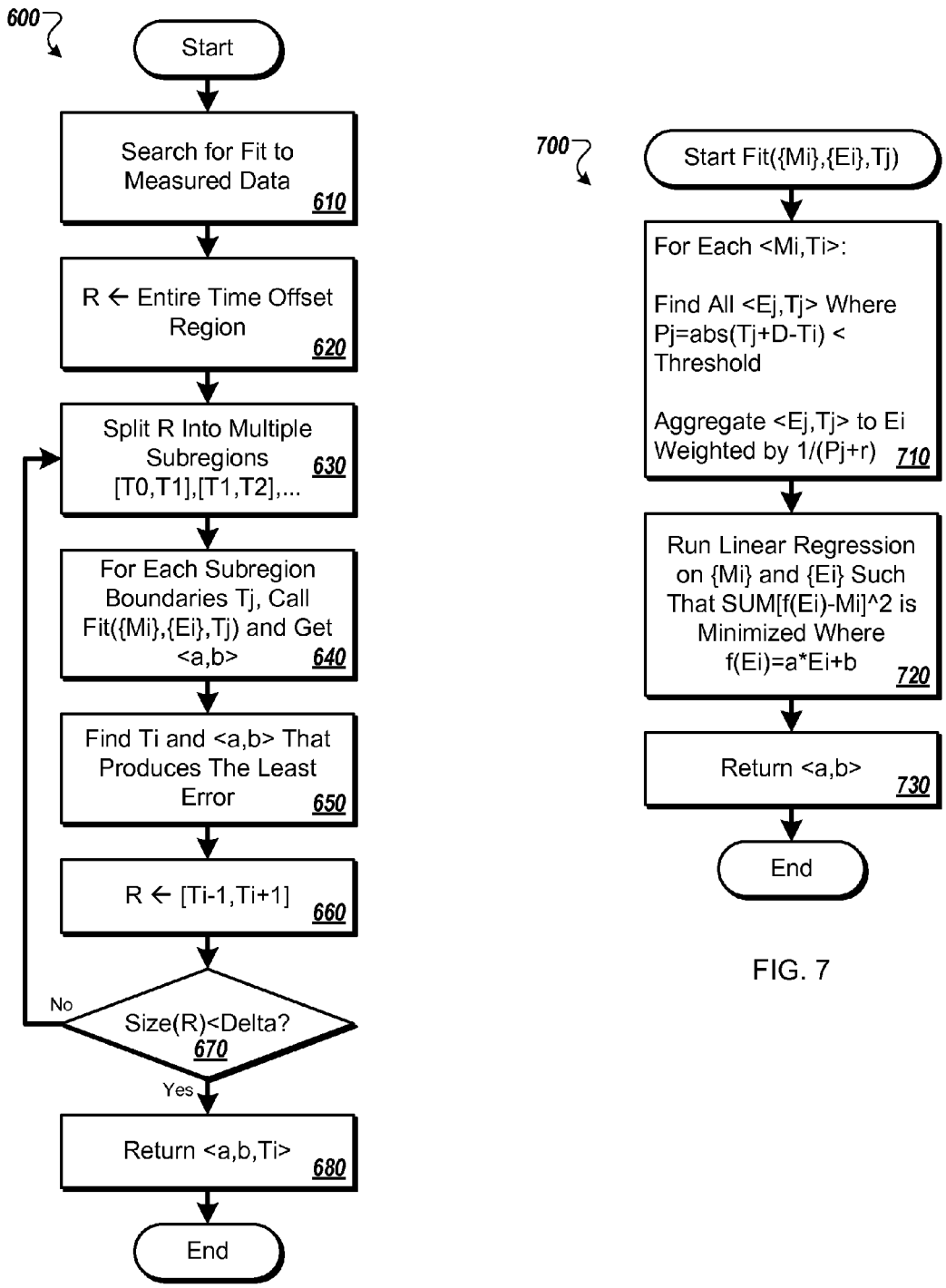
FIGS. 6-8 are flow diagrams of an example processes for estimating the power consumption of an electrical load.
Figure 8:
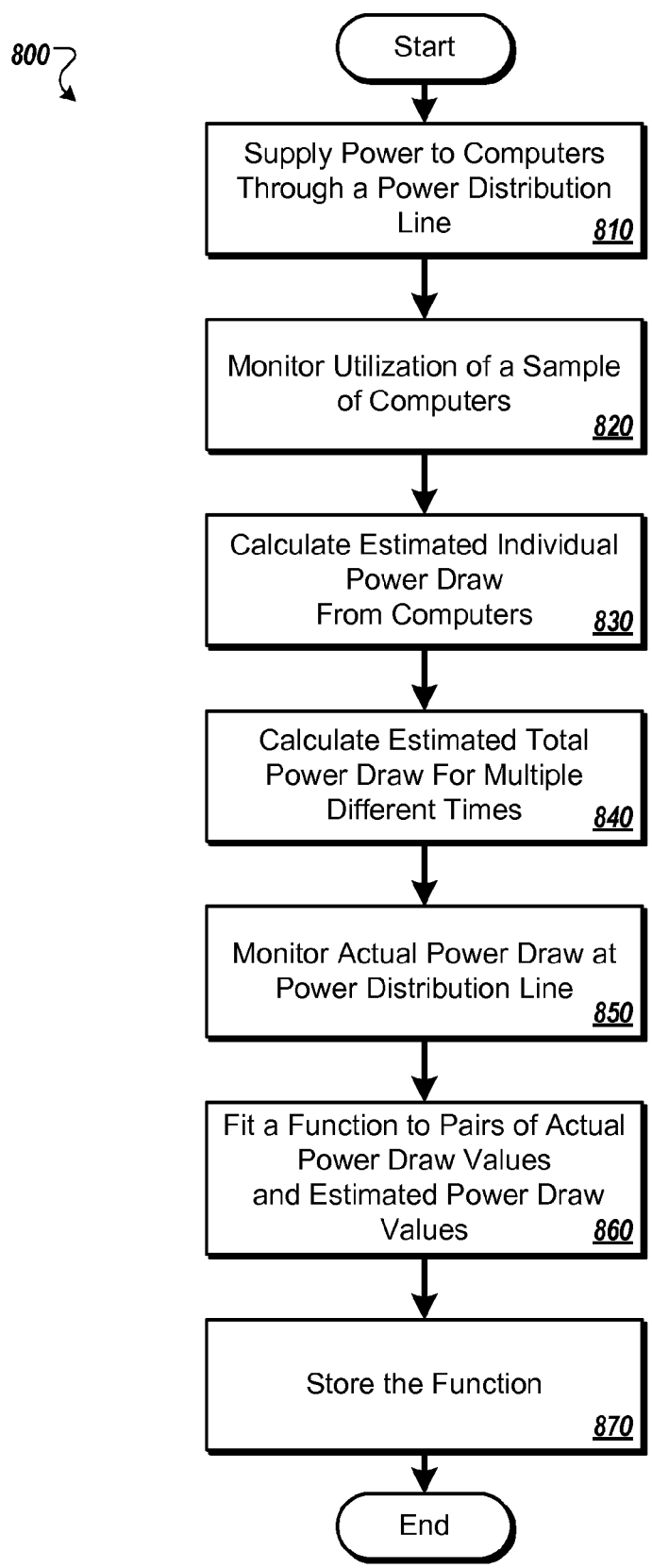

FIGS. 6-8 are flow diagrams of example processes for estimating the power consumption of an electrical load. Referring to FIG. 6, an example process 600 starts at step 610. In some implementations, the process 600 may be performed by the PMMs 107, 110a, 110b, 118a, 118b, 204, and 302a-302f of FIGS. 1-3. At step 610, a mathematical function that fits a collection of measured data is sought. At step 620, a region "R" is determined as an entire time offset region. At step 630, the region "R" is split into multiple subregions (e.g., T0 to T1, T1 to T2, . . . ).

At step 640, for each subregion boundary, designated as "Tj", a fitting process is performed for a collection of measured power consumption values "Mi" and a collection of estimated power consumption values "Ei" determined at the corresponding subregion boundary "Tj" to determine the proportional error value "a" and the offset value "b". An example fitting process is discussed in the description of FIG. 7.

At step 650, a time "Ti" and the corresponding values of "a" and "b" that produce substantially the least error at time "Ti" are found. At step 660, the region "R" is designated as extending from one time period prior to the time "Ti" to one time period after the time "Ti".

At step 670, if the size of the region "R" is determined not to be less than a predetermined size "Delta", then step 630 is repeated. If, however, at step 670 the size of the region "R" is determined to be less than a predetermined size "Delta", then at step 680 the values for "a", "b", and "Ti" are returned.

Referring now to FIG. 7, an example process 700 is illustrated. In some implementations, the process 700 may be performed by the PMMs 107, 110a, 110b, 118a, 118b, 204, and 302a-302f of FIGS. 1-3. In some implementations, the process 700 may be the fitting process performed as part of step 640 of FIG. 6. The process 700 starts with a given collection of measured power consumption values "Mi", a collection of estimated power consumption values "Ei", and a time boundary value "Tj".

At step 710, for each measured value "Mi" and corresponding time "Ti", all corresponding pairs of "Ej" and "Tj" are found for when "Pj", which equals the absolute value of "(Tj+D−Ti)," is less than a predetermined threshold value. "Ej" and "Tj" are aggregated to "Ei", weighted by the mathematical function "1/(Pj+r)".

At step 720, linear regression is performed on the collection of measured values "Mi" and the collection of expected values "Ei" such that the SUM(f(Ei)−Mi)^2 is substantially minimized where f(Ei)=a*Ei+b. At step 730, the values of "a" and "b" are returned.

Referring now to FIG. 8, an example process 800 is illustrated. In some implementations, the process 800 may be performed by the PMMs 107, 110a, 110b, 118a, 118b, 204, and 302a-302f of FIGS. 1-3. In general, the process 800 describes a technique for comparing estimated power draws and corresponding measured power draws to determine a function that more accurately estimates power draws.

Power is supplied to computers through a power distribution line (step 810). For example, the PMM 110a can receive "X" amperes through the branch conductor 108a. The utilization of a sample of computers is monitored (step 820). For example, the server computers 115 in the electrical load 114 may be monitored to determine their utilization (e.g., percent of used computing capacity).

In some implementations, the estimated individual power draw from the computers in an electrical load can be calculated based on the individual utilization of each computer. For example, the electrical load 114 may include fifteen computers drawing an estimated total of 6 A. In such an example, each computer in the electrical load 114 may be drawing a calculated average of 6/15 of an amp, or 0.4 A per computer.

At step 840, the estimated total power draw is calculated at multiple different times, e.g., corresponding to different times at which utilization measurements were collected.

As the utilization is monitored, the actual power draw at the power distribution line is also monitored (step 850). For example, the PMM 204 may use the current measurement module 220 to measure the actual amount of power being passed from the electrical power source 222 to the electrical load 202. Each estimated total power draw value is associated with an actual power draw value based on the time of the measurement, e.g., as discussed for FIG. 5.

A function is fitted to pairs of actual power draw values and estimated power draw values (step 860). In some implementations, the actual power draw values and estimated power draw values are paired time-wise. For example, the measured value 510b may be paired with the estimated value 540a because the estimated value 540a is the estimated value that is the closest, time-wise of the collection of estimated values 520b to the measured value 510b. In some implementations, the measured power draw values may be paired with aggregate values that represents collections of time-wise close estimated values. For example, the measured value 510a may be paired with a mean value of the collection of estimated values 520a. In some implementations, the PMM 110a may perform the fitting processes 600 or 700 to determine the fit function represented by the line 430 of FIG. 4. In some implementations, the function can be a linear function. In the example of the line 430, the fit function is determined by a comparison of measured values "M" to estimated values "E", which generates a proportional error parameter "a" and an offset "b" as applied to the formula "M=aE+b". In some implementations, calculating the estimated individual power draw can include storing data representing a computer configuration for each of a collection of computers, and the computer configuration can be an input to a function relating utilization to estimated individual power. In some implementations, the computer configuration can include one or more of processor speed, amount of memory or number of disk drives. For example, the PMM 110a may estimate that the electrical load 114 will draw an estimated 22 A of power at 65% utilization.

In some implementations, calculating the estimated total power draw can include summing the estimated individual power draw of each of the sample of the plurality of computers. In some implementations, the sample can include substantially all of the plurality of computers. For example the electrical load 114 may include twenty computers that are estimated to draw approximately 1.5 A each at 90% utilization. The PMM 110a may therefore estimate that the electrical load 114 may draw approximately 1.5×20, or 30 A.

At step 870, the function is stored. For example, the PMM 110a may store the function and then recall and use the function again at a later time, such as to determine an updated estimated power draw for an updated utilization level.

In some implementations, the process 800 may also include steps for receiving a maximum power draw value for the portion of the data center, calculating an estimated current individual power draw value for each of the sample of the plurality of computers based on the utilization, and calculating an estimated current total power draw value from the estimated current individual power draw value of each of the sample of the plurality of computers. In some implementations, the process 800 can also include steps for calculating an adjusted maximum power draw value from the maximum power draw value and the function, and comparing the estimated current total power draw value to the adjusted maximum power draw value. In some implementations, the process 800 can also include steps for calculating an adjusted estimated current total power draw value from the estimated current total power draw value and the function, and comparing the adjusted estimated total power draw value to the maximum power draw value. In some implementations, the process 800 can also include a step for adjusting operation of at least one computer in the plurality of computers based on the comparison. For example, the PMM 110a may receive an allocation of "X" amperes that can be drawn from the substation 106. To substantially maximize the usage of the allocated power, the PMM 110a may determine a utilization level for the electrical load 114 that may cause the electrical load 114 to draw an estimated "X" amperes of current.

In some implementations, the adjusting operation may include one or more of adjusting job allocation, adjusting job scheduling or adjusting central processing unit execution frequency. For example, the PMM 110a may alter the power draw of the electrical load 114 by altering the number of jobs assigned to the electrical load's 114 computers, by altering the scheduling of when computing jobs are to be performed (e.g., load leveling), or by altering the speed of the computers' CPUs.

Figure 9:
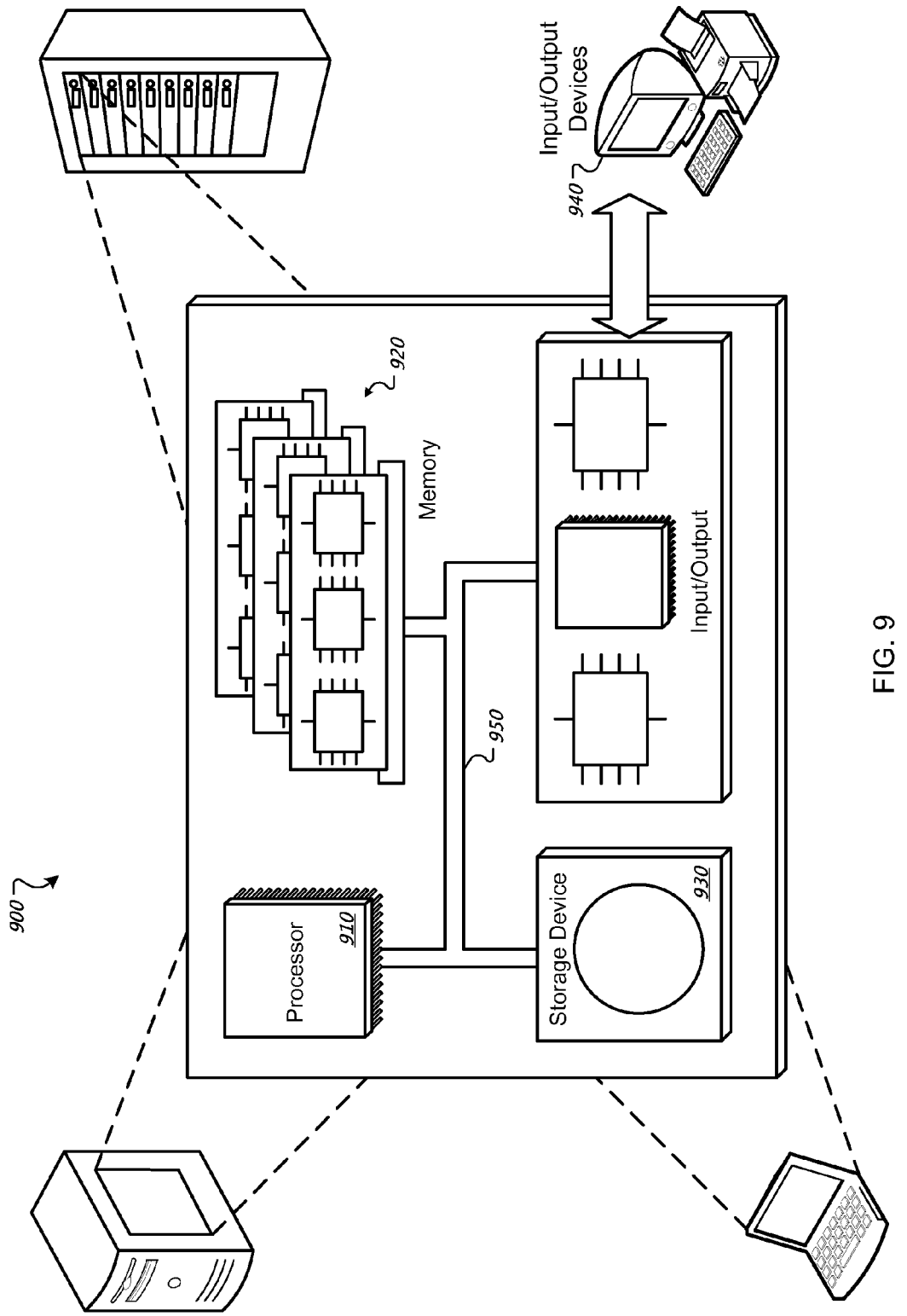
FIG. 9 is a schematic diagram of an example of a generic computer system.

FIG. 9 is a schematic diagram of an example of a generic computer system 900. The system 900 can be used for the operations described in association with the processes 600-800 according to some implementations. For example, the system 900 may be included in either or all of the PMMs 107, 110a, 110b, 118a, 118b, 204, 302a-302f, and/or the computers 115, 121a, and 121b in the electrical loads 114, 120a, and 120b.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Typical elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other implementations are within the scope of the following claims.

What is claimed is:

1. A method of correlating power in a data center, comprising:
   supplying power to a portion of a data center through a power distribution line, the portion of the data center including a plurality of computers that draw power through a circuit breaker;
   monitoring CPU utilization of a statistical sample of the plurality of computers, the statistical sample being a statistically significant number of the plurality of computers that is less than all of the plurality of computers;
   calculating an estimated individual power draw for each of the statistical sample of the plurality of computers based on the utilization;
   calculating an estimated total power draw for each of a plurality of different times from the estimated individual power draw of each of the statistical sample of the plurality of computers to generate a plurality of estimated total power draw values for the plurality of different times;
   monitoring actual power draw at the power distribution line by the portion of the data center and generating a plurality of actual power draw values for the plurality of different times;
   fitting a function to a plurality of pairs of actual power draw values and estimated power draw values, each pair of the plurality of pairs comprising an actual draw value and an estimated draw value for the same time; and
   storing the function.

2. The method of claim 1, wherein calculating the estimated individual power draw comprises storing data representing a computer configuration for each of the plurality of computers, and the computer configuration is an input to a function relating utilization to estimated individual power.

3. The method of claim 2, wherein the computer configuration includes one or more of processor speed, amount of memory or number of disk drives.

4. The method of claim 1, wherein calculating the estimated total power draw comprises summing the estimated individual power draw of each of the statistical sample of the plurality of computers.

5. The method of claim 1, wherein the function is a linear function.

6. The method of claim 1, further comprising:
   receiving a maximum power draw value for the portion of the data center;
   calculating an estimated current individual power draw value for each of the statistical sample of the plurality of computers based on the utilization;
   calculating an estimated current total power draw value from the estimated current individual power draw value of each of the statistical sample of the plurality of computers;
   at least one of
      calculating an adjusted maximum power draw value from the maximum power draw value and the function, and comparing the estimated current total power draw value to the adjusted maximum power draw value, or
      calculating an adjusted estimated current total power draw value from the estimated current total power draw value and the function, and comparing the adjusted estimated total power draw value to the maximum power draw value; and
   adjusting operation of at least one computer in the plurality of computers based on the comparison.

7. The method of claim 6, wherein adjusting operation comprises one or more of adjusting job allocation, adjusting job scheduling or adjusting central processing unit execution frequency.

8. The method of claim 6, comprising calculating the adjusted maximum power draw value from the maximum power draw value and the function, and comparing the estimated current total power draw value to the adjusted maximum power draw value.

9. The method of claim 8, wherein adjusting operation comprises adjusting a multiplicity of computers in the plurality of computers to cause the estimated current total power draw value to be closer to the adjusted maximum power draw value.

10. The method of claim 6, comprising calculating the adjusted estimated current total power draw value from the estimated current total power draw value and the function, and comparing the adjusted estimated total power draw value to the maximum power draw value.

11. The method of claim 10, wherein adjusting operation comprises adjusting a multiplicity of computers in the plurality of computers to cause the adjusted estimated total power draw value to be closer to the maximum power draw value.

12. The method of claim 1, wherein calculating an estimated individual power draw for a computer of the plurality of computers comprises measuring utilization of the computer at a plurality of utilization measurement times to generate a plurality of utilization values for the computer, there being a greater number of utilization measurement times than different times such that there are a greater number of utilization values for the computer than different times.

13. The method of claim 12, further comprising associating each of the plurality of utilization values with one of the plurality of different times.

14. The method of claim 13, wherein associating includes comparing a utilization measurement time for a utilization value with a midpoint between two adjacent different times.

15. The method of claim 13, wherein there is a plurality of utilization value times for each of plurality of different times.

16. The method of claim 15, wherein calculating the estimated total power draw for one of the different times comprises weighting each estimated individual power draw in the plurality of estimated power draw values based on a difference between a value estimating time for the estimate value and the different time.

17. The method of claim 12, further comprising synchronizing time stamps of the different times and the utilization measurement times.

18. The method of claim 1, wherein calculating an estimated total power draw occurs at a higher frequency than monitoring actual power draw.

19. The method of claim 1, wherein the plurality of computers comprises a population of computers in a datacenter.

20. A data center, comprising:
- a power distribution line;
- a plurality of computers that draw power from the power distribution line through a circuit breaker, wherein each computer of a statistical sample of the plurality of computers is configured to generate a measurement of CPU utilization of the computer, the sample being a statistically significant number of the plurality of computers that is less than all of the plurality of computers;
- a processor configured to
    - receive the measurement of CPU utilization from the statistical sample of the plurality of computer,
    - calculate an estimated individual power draw for each of the statistical sample of the plurality of computers based on the utilization,
    - calculate an estimated total power draw for each of a plurality of different times from the estimated individual power draw of each of the statistical sample of the plurality of computers to generate a plurality of estimated total power draw values for the plurality of different times,
    - receive a measurement of an actual power draw at the power distribution line by the portion of the data center and generate a plurality of actual power draw values for the plurality of different times,
    - fit a function to a plurality of pairs of actual power draw values and estimated power draw values, each pair of the plurality of pairs comprising an actual draw value and an estimated draw value for the same time, and
    - store the function.

21. A non-transitory computer readable medium storing instructions that, when executed by one or more processors, cause the one or more processors to perform operations comprising:
- receiving the measurement of CPU utilization from a statistical sample of a plurality of computers, the statistical sample being a statistically significant number of the plurality of computers that is less than all of the plurality of computers,
- calculate an estimated individual power draw for each of the statistical sample of the plurality of computers based on the utilization,
- calculate an estimated total power draw for each of a plurality of different times from the estimated individual power draw of each of the statistical sample of the plurality of computers to generate a plurality of estimated total power draw values for the plurality of different times,
- receive a measurement of an actual power draw at the power distribution line by the portion of the data center and generate a plurality of actual power draw values for the plurality of different times,
- fit a function to a plurality of pairs of actual power draw values and estimated power draw values, each pair of the plurality of pairs comprising an actual draw value and an estimated draw value for the same time, and
- store the function.

22. The computer readable medium of claim 21, wherein the plurality of computers comprises a population of computers in a datacenter.

\* \* \* \* \*